United States Patent [19]

Gates

[11] Patent Number: 4,973,998
[45] Date of Patent: Nov. 27, 1990

[54] DISPOSABLE SINGLE-USE CAMERA AND ACCESSORY RE-USABLE ELECTRONIC FLASH UNIT

[75] Inventor: Richard A. Gates, Hilton, N.Y.

[73] Assignee: Eastman Kodak Company, Rochester, N.Y.

[21] Appl. No.: 465,672

[22] Filed: Jan. 16, 1990

[51] Int. Cl.$^5$ .................. G03B 15/05; G03B 17/02
[52] U.S. Cl. .................. 354/145.1; 354/147; 354/288
[58] Field of Search .................. 354/126, 129, 145.1, 354/147, 149.11, 288

[56] References Cited

U.S. PATENT DOCUMENTS

| | | | |
|---|---|---|---|
| 3,577,899 | 5/1971 | Ikegami | 354/126 |
| 4,106,077 | 8/1978 | Furda | 362/8 |
| 4,666,274 | 5/1987 | Maeno et al. | 354/64 |
| 4,751,536 | 6/1988 | Ohmura et al. | 354/75 |
| 4,758,852 | 7/1988 | Maejima | 354/75 |
| 4,801,957 | 1/1989 | Vandemoere | 354/147 |
| 4,903,058 | 2/1990 | Schappler | 354/145.1 |

Primary Examiner—A. A. Mathews
Attorney, Agent, or Firm—Roger A. Fields

[57] ABSTRACT

A disposable single-use camera is generally of the type wherein an inner camera part is pre-loaded with film and includes a taking lens, and an outer sealed pack contains the inner camera part and has an opening for the taking lens. The inner camera part has flash synchronization access ports and the outer sealed pack is constructed of a perforable material which overlays the access ports. An accessory re-usable electronic flash unit intended for use with the disposable camera has electrically conductive flash synchronization pins shaped to perforate the outer sealed pack to enter the access ports to connect the flash unit to the disposable camera. According to the invention, the inner camera part includes engageable locator means fixed with respect to the acccess ports, and the flash unit includes positioning means adapted to perforate the outer sealed pack before the flash synchronization pins can perforate the pack for engaging the locator means to properly position the pins for entry into the access ports.

4 Claims, 4 Drawing Sheets 4,973,998

DISPOSABLE SINGLE-USE CAMERA AND ACCESSORY RE-USABLE ELECTRONIC FLASH UNIT

CROSS-REFERENCE TO A RELATED APPLICATION

Reference is made to commonly assigned copending application Ser. No. 07/363,558 entitled RE-USABLE ELECTRONIC FLASH UNIT FOR DISPOSABLE SINGLE-USE CAMERA and filed June 8, 1989 in the name of Joseph T. Shappler, now U.S. Pat. No. 4,903,058.

FILED OF THE INVENTION

The invention relates generally to the field of photography, and particularly to a disposable single-use camera and an accessory re-usable electronic flash unit intended for use with the disposable camera.

DESCRIPTION OF THE PRIOR ART

Recently, a disposable single-use 35 mm camera referred to as the "Quick Snap" was introduced by Fuji Photo Film Co. Ltd., and another disposable single-use 35 mm camera referred to as the "Fling 35" was introduced by Eastman Kodak Co. Generally, each disposable camera is a point-and-shoot type and comprises (1) a plastic inner camera part including a taking lens, a film metering mechanism, and a shutter, and (2) a cardboard outer sealed pack which contains the inner camera part and has respective openings for the taking lens and for a shutter release button, a frame counter window, a film advance thumbwheel, and a simple see-through viewfinder provided on the inner camera part. At the manufacturer, the inner camera part is loaded with a conventional 24-exposure 35 mm film cartridge and substantially the entire length of the unexposed filmstrip is factory prewound from the cartridge into a supply chamber within the inner camera part. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera part from the cardboard sealed pack and then removes the filmstrip from the inner camera part. The filmstrip is processed, and the inner camera part and the opened pack are thrown away.

While neither of these disposable cameras is intended for use with an electronic flash unit, Fuji Photo Film Co. Ltd. has now made available a disposable camera having a built-in electronic flash unit. Both the camera part and the built-in flash unit are contained within the sealed pack. When the disposable camera is sent to the photofinisher, the same must be done to the built-in flash unit. The disadvantage is that this arrangement significantly increases the selling price of the camera assembly.

Commonly assigned U.S. Pat. No. 4,801,957, issued Jan. 31, 1989, discloses a disposable single-use camera generally of the type wherein an inner camera part is pre-loaded with film and includes a taking lens, and an outer sealed pack contains the camera part and has an opening for the taking lens. According to the invention, the inner camera part has flash synchronization access ports and the outer sealed pack is constructed of a perforable material which overlays the access ports. An accessory re-usable electronic flash unit intended for use with the disposable camera includes electrically conductive flash synchronization pins shaped to perforate the outer sealed pack to enter the access ports to connect the flash unit with the inner camera part. Since the accessory flash unit is removable from the disposable camera, only the disposable camera need be returned to the photofinisher; the flash unit is retained by the customer for re-use with a fresh camera.

The Cross-Referenced Application

The application cross-referenced above discloses a disposable single-use camera generally of the type wherein an inner camera part is pre-loaded with film and includes a taking lens, and an outer sealed pack contains the camera part and has an opening for the taking lens. The inner camera part has flash synchronization access ports and the outer sealed pack is constructed of a perforable material which overlays the access ports. An accessory re-usable electronic flash unit intended for use with the disposable camera includes electrically conductive flash synchronization pins shaped to perforate the outer sealed pack to enter the access ports to connect the flash unit with the disposable camera. According to the invention, the flash synchronization pins are supported on a folding arm which is foldable to a storage position to make the flash unit compact and to conceal the pins when the flash unit is not connected to the disposable camera.

SUMMARY OF THE INVENTION

According to the invention, there is provided an improved combination of a disposable single-use camera and an accessory re-usable electronic flash unit, wherein the disposable camera comprises (a) an inner camera part pre-loaded with film and including a taking lens and flash synchronization access ports, and (b) an outer sealed perforable pack containing the inner camera part and having an opening for the taking lens, wherein the flash unit has electrically conductive flash synchronization pins shaped to perforate the outer sealed pack to enter the access ports, and wherein the improvement comprises:

said inner camera part includes engageable locator means fixed with respect to the access ports; and said flash unit includes positioning means adapted to perforate the outer sealed pack before the flash synchronization pins can perforate the pack, for engaging the locator means to properly position the pins for entry into the access ports.

DETAILED DESCRIPTION OF THE PREFERRED EMBODIMENT

The invention is disclosed in connection with a 35 mm camera and an electronic flash unit. Because such a camera and flash unit are widely known, this description is directed in particular to photographic elements forming part of or cooperating directly with the invention. It is to be understood, however, that other elements not specifically shown or described may take various forms known to persons of ordinary still in the art.

Figure 1:
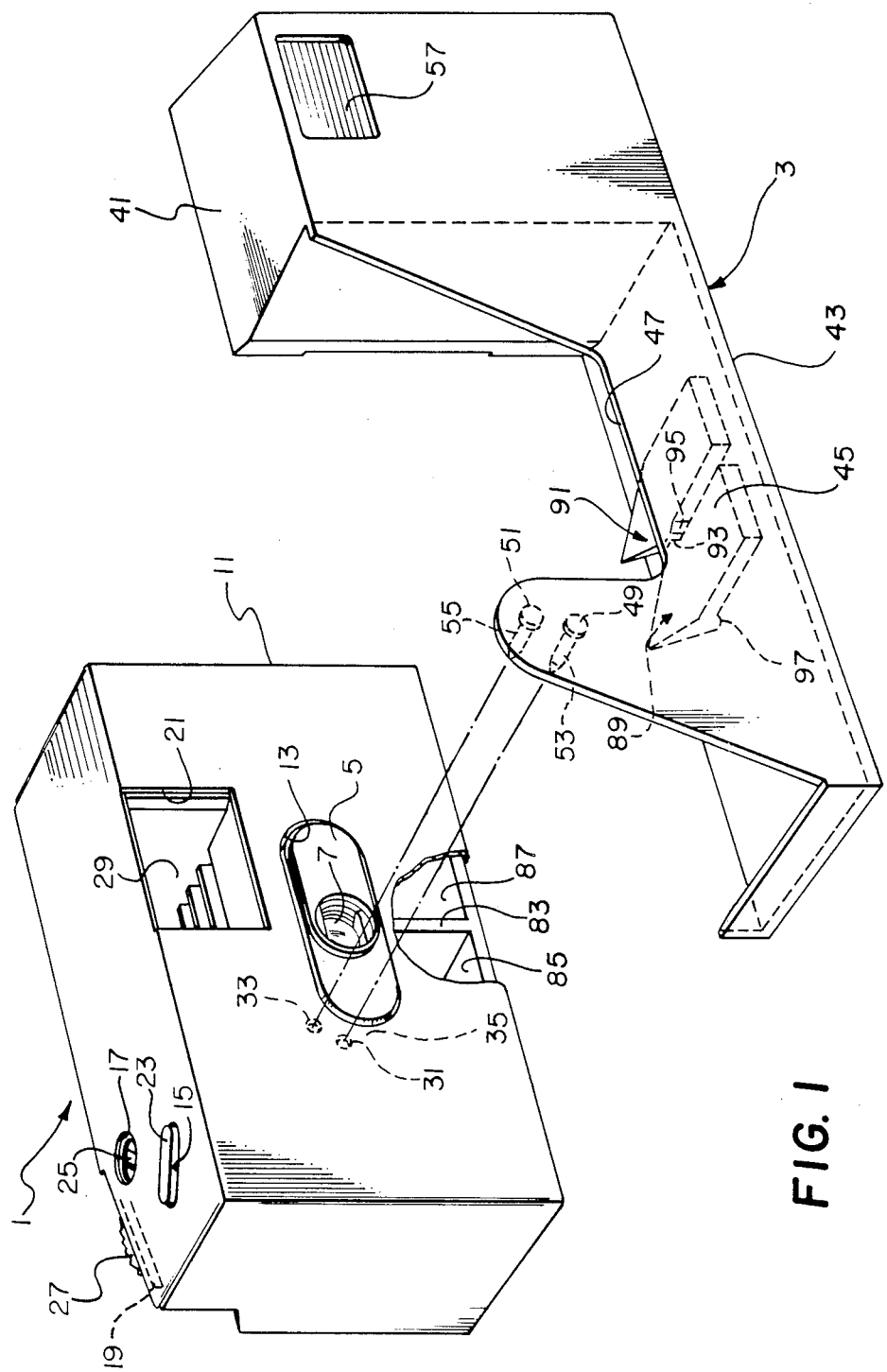
FIG. 1 is a front perspective view of a disposable single-use camera and an accessory re-usable electronic flash unit, according to a preferred embodiment of the invention.

Referring now to the drawings, FIG. 1 depicts a disposable single-use 35 mm camera 1 and an accessory re-usable electronic flash unit 3. As shown in FIGS. 1–4, the disposable camera 1 is a point-and-shoot type and comprises (1) an inner camera part 5 including a taking lens 7, a film metering mechanism (not shown), and a single blade shutter 9 and (2) an outer sealed pack 11 which contains the inner camera part and has respective openings 13, 15, 17, 19, and 21 for the taking lens, a shutter release button 23, a frame counter window 25, a film advance thumbwheel 27, and a direct see-through viewfinder 29. The release button 23, the counter window 25, the thumbwheel 27, and the viewfinder 29, like the taking lens 7, are located on the inner camera part 5. The outer sealed pack 11 is decorative in nature and is constructed of a paper-like material, such as cardboard. The inner camera part 5 is constructed of plastic.

At the manufacturer, the inner camera part 5 is loaded with a conventional 24-exposure 35 mm film cartridge and substantially the entire length of the unexposed filmstrip is factory prewound from the cartridge onto a take-up spool (not shown) of the camera part. After the customer takes a picture by depressing the release button 23, the thumbwheel 27 is manually rotated to rewind the exposed frame into the cartridge. The rewinding movement of the filmstrip the equivalent of one frame rotates a metering sprocket (not shown) to decrement a frame counter (not shown) to its next lower numbered setting. When substantially the entire length of the filmstrip is exposed and rewound into the cartridge, the single-use camera 1 is sent to a photofinisher who first removes the inner camera part 5 from the cardboard sealed pack 11 and then removes the filmstrip from the inner camera part. The filmstrip is processed, and the inner camera part and the opened pack are thrown away.

Figure 3:
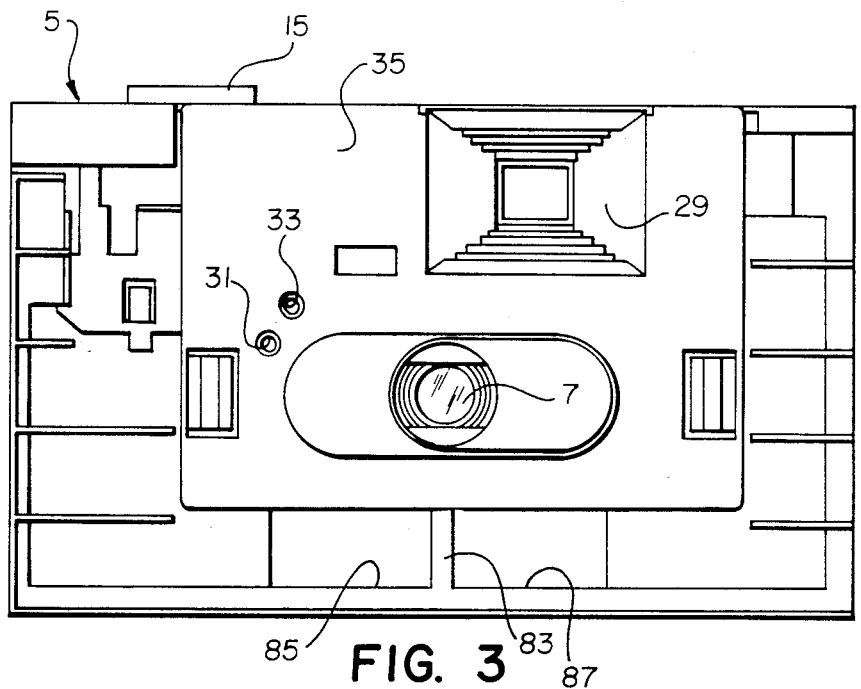
FIG. 3 is a front elevation view of a inner camera part of the single-use camera, showing a front face of the camera part and a taking lens.
Figure 4:
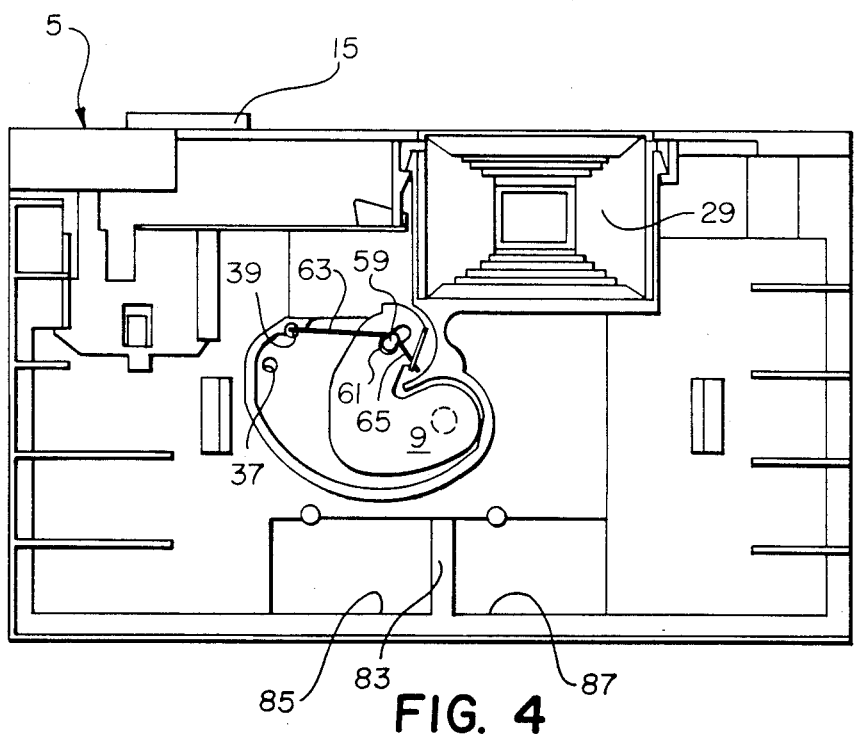
FIG. 4 is a front elevation view of the inner camera part, showing a portion of its front face and the taking lens removed to illustrate a closed shutter.

As shown in FIG. 3, the inner camera part 5 has a pair of flash synchronization access ports or openings 31 and 33 which extend through a front face 35 of the inner camera part at a location proximate the taking lens 7. The respective access ports 31 and 33 are aligned with corresponding recesses 37 and 39 which, as can be seen in FIG. 4, are located proximate the single blade shutter 9. Normally, the two access ports 31 and 33 are covered by the outer sealed pack 11. See FIG. 1.

The re-usable flash unit 3, in addition to having a conventional flash emission device 41, includes an integral shell-like portion 43 which is dimensioned to fit over the single-use camera 1 in the manner shown in FIG. 1. A front wall 45 of the shell-like portion 43 is cut away along an edge 47 to expose the taking lens 7. Respective supports 49 and 51 for a pair of electrically conductive flash synchronization pins 53 and 55 are located on the inside of the front wall 45. The two conductive pins 53 and 55 have pointed tips to enable them to readily perforate the outer sealed pack 11. When the shell-like portion 43 is fit over the single-use camera 1 as shown in FIG. 1, a flash window 57 of the flash emission device 41 is positioned in proper relation with the taking lens 7 for a flash exposure and the two conductive pins 53 and 55 are driven or forced through the outer sealed pack 11, directly into the respective access ports 31 and 33. The two conductive pins 53 and 55 then bottom out in the respective recesses 37 and 39. See FIG. 4.

Figure 5:
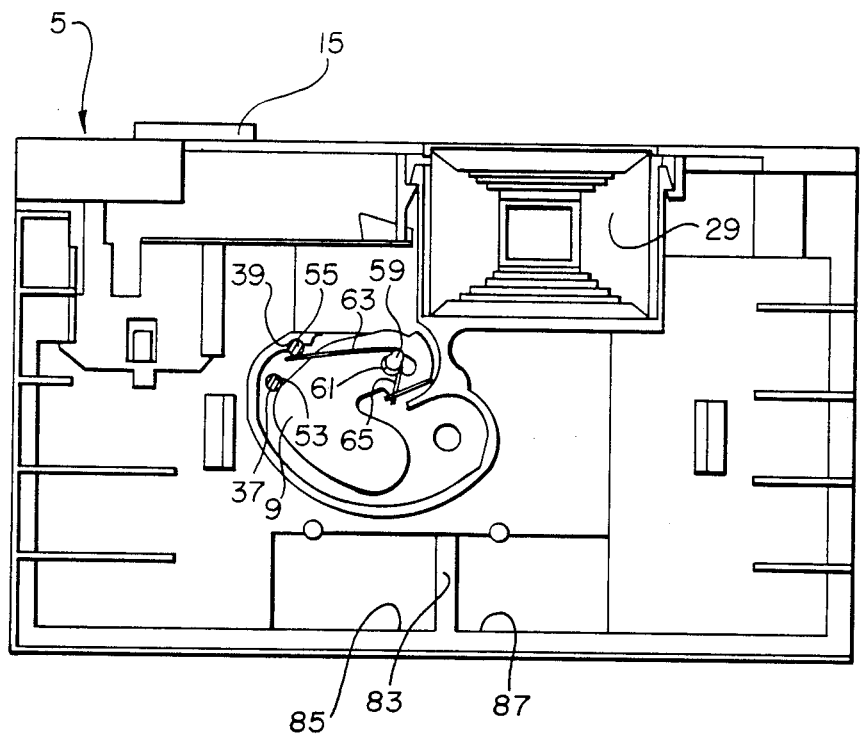
FIG. 5 is a front elevation view similar to FIG. 4, illustrating the shutter fully opened.

The shutter blade 9 is electrically conductive and is mounted for pivotable movement about a fixed pin 59, against the urging of an electrically conductive return spring 61, from a closed position shown in FIG. 4 to a fully opened position shown in FIG. 5. The access port 33 and its corresponding recess 39 are arranged to position the conductive pin 55 in continuous contact with one leg 63 of the return spring 61. Another leg 65 of the return spring 61 is connected to the shutter blade 9. The access port 31 and its corresponding recess 37 are arranged to position the conductive pin 53 in contact with the shutter blade 9 only when the shutter blade is fully opened. When the two conductive pins 53 and 55 enter the access ports 31 and 33 and bottom out in the corresponding recesses 37 and 39, and the shutter blade 9 is then fully opened, a conventional flash synchronization or trigger circuit (not shown) is completed between the shutter blade and the flash emission device 41.

Figure 2:
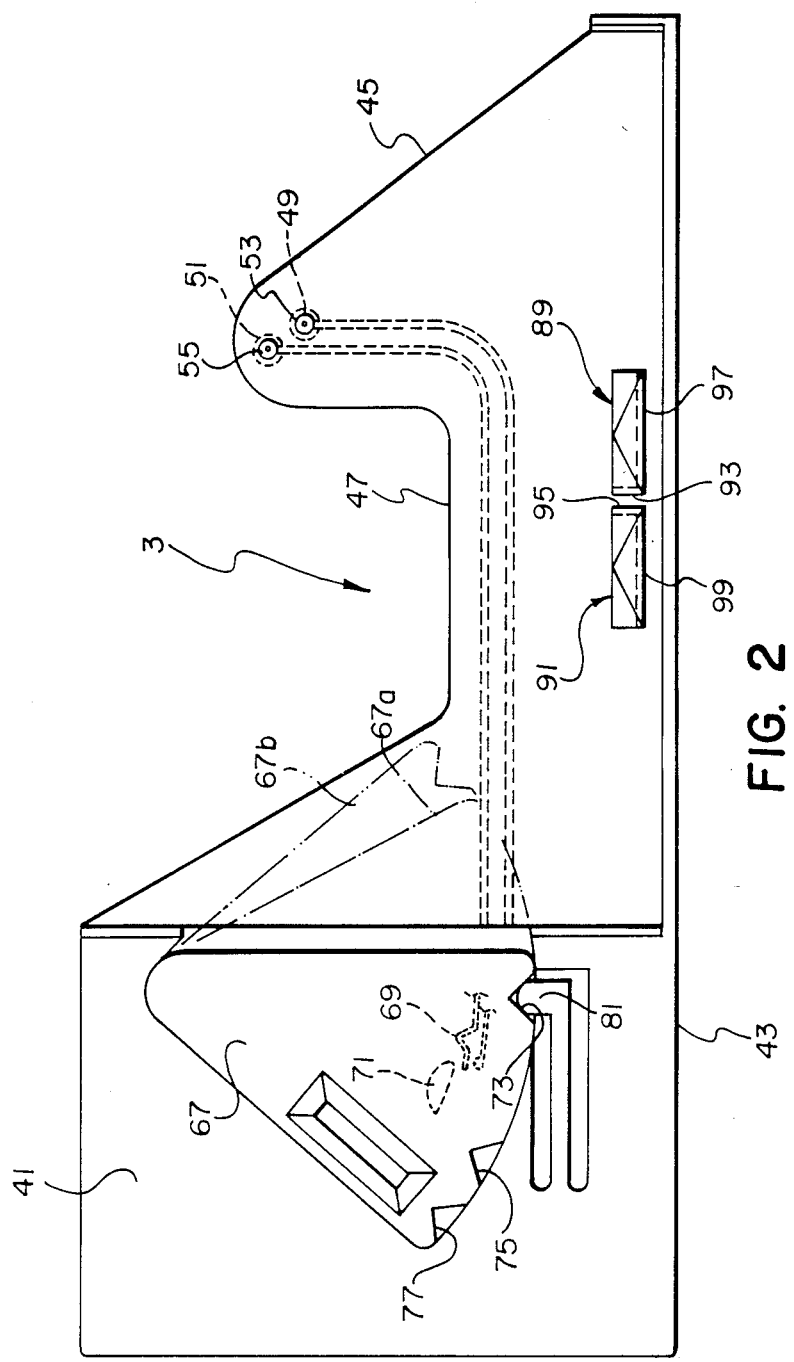
FIG. 2 is a rear elevation view of the flash unit.

As shown in FIG. 2, at the back of the flash emission device 41, there is provided a pivotally mounted locking/switching member 67 which, when swung from its illustrated position to an intermediate broken line position 67a, partially covers the rear of the single-use camera 1 to secure the shell-like portion 43 to the single-use camera, and which, when swung from the intermediate broken line position to a final broken line position 67b, closes a conventional normally opened flash energizing switch 69 to ready the flash emission device 41 for firing when the shutter blade 9 is fully opened. The locking/switching member 67 includes a cam element 71 for closing the flash energizing switch 69 and has three v-shaped cut-outs 73, 75, and 77 respectively engageable with a spring-urged arresting element 81 to releasably secure the locking/switching member 67 in its three positions.

According to the invention, the inner camera part 5 as shown in FIGS. 1 and 3 includes an upstanding integral locator rib 83 and a pair of planar integral locator surfaces 85 and 87 disposed adjacent two opposite sides of the locator rib. The locator rib 83 and the two locator surfaces 85 and 87 are fixed with respect to the pair of access ports 31 and 33. The flash unit 3 as shown in FIGS. 1 and 2 includes on the inside of its front wall 45 a pair of integral perforating members 89 and 91 having pointed tips to enable them to readily perforate the outer sealed pack 11. When the flash unit 3 is fit over the single-use camera 1 as shown in FIG. 1, the two perforating members 89 and 91 perforate the outer sealed pack 11 substantially before the two conductive pins 53 and 55 can perforate the pack. Then, immediately thereafter, a pair of facing nubs 93 and 95 on the respective perforating members 89 and 91 firmly bear against the opposite sides of the locator rib 83, and a pair of bottom nubs 97 and 99 on the respective perforating members firmly bear against the respective locator surfaces 85 and 87. This is done to properly position the two conductive pins 53 and 55 for entry into the respective access ports 31 and 33. Since the two perforating members 89 and 91 can be moved inwardly along the locator rib 83 and the two locator surfaces 85 and 87, the two conductive pins 53 and 55 can be driven into the respective access ports 31 and 33 until they bottom out in the corresponding recesses 37 and 39. See FIG. 4.

The invention has been described with reference to a preferred embodiment. However, it will be appreciated that variations and modifications can be effected within the ordinary skill in the art without departing from the scope of the invention.

I claim:

1. An improved combination of disposable single-use camera and an accessory re-usable electronic flash unit, wherein said disposable camera comprises (a) an inner camera part pre-loaded with film and including a taking lens and flash synchronization access ports, and (b) an outer sealed perforable pack containing said inner camera part and having an opening for said taking lens, wherein said flash unit has electrically conductive flash synchronization pins shaped to perforate said outer sealed pack to enter said access ports, and wherein the improvement comprises:

said inner camera part includes engageable locator means fixed with respect to said access ports; and
said flash unit includes positioning means adapted to perforate said outer sealed pack before said flash synchronization pins can perforate the pack, for engaging said locator means to position the pins for entry into said access ports.

2. The improvement as recited in claim 1, wherein said positioning means is adapted to engage said locator means in movable relation to permit said flash unit and said inner camera part to be moved with respect to one another to move said flash synchronization pins into said access ports following engagement of the positioning means and the locator means.

3. The improvement as recited in claim 2, wherein said locator means includes a rib member integrally formed with said inner camera part, and said positioning means includes a pair of perforating members spaced slightly apart to snugly receive said rib member between them after they have perforated said outer sealed pack.

4. An improved accessory re-usable electronic flash unit intended for use with a disposable single-use camera comprising (a) an inner camera part pre-loaded with film and including a taking lens, flash synchronization access ports, and engageable locator means fixed with respect to the access ports, and (b) an outer sealed perforable pack containing the inner camera part and having an opening for the taking lens, wherein said flash unit has electrically conductive flash synchronization pins shaped to perforate the outer sealed pack to enter the access ports, and wherein the improvement comprises:

said flash unit includes positioning means adapted to perforate the outer sealed pack before said flash synchronization pins can perforate the pack, for engaging the locator means to position the pins for entry into the access ports.

* * * * *